May 16, 1967     J. J. KAREW ETAL     3,320,488
STRIP LINE POWER HARNESS

Original Filed March 28, 1963     5 Sheets-Sheet 1

INVENTORS.
JOSEPH J. KAREW
HARRY W. HESS
JAMES E. JONES
BY
William R. Nolte
AGENT INVENTORS.
JOSEPH J. KAREW
HARRY W. HESS
JAMES E. JONES
BY William R. Nolte
AGENT

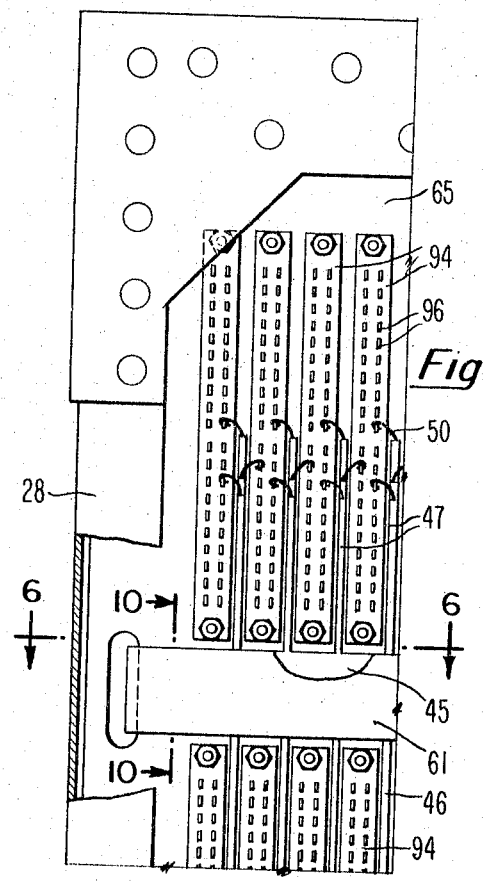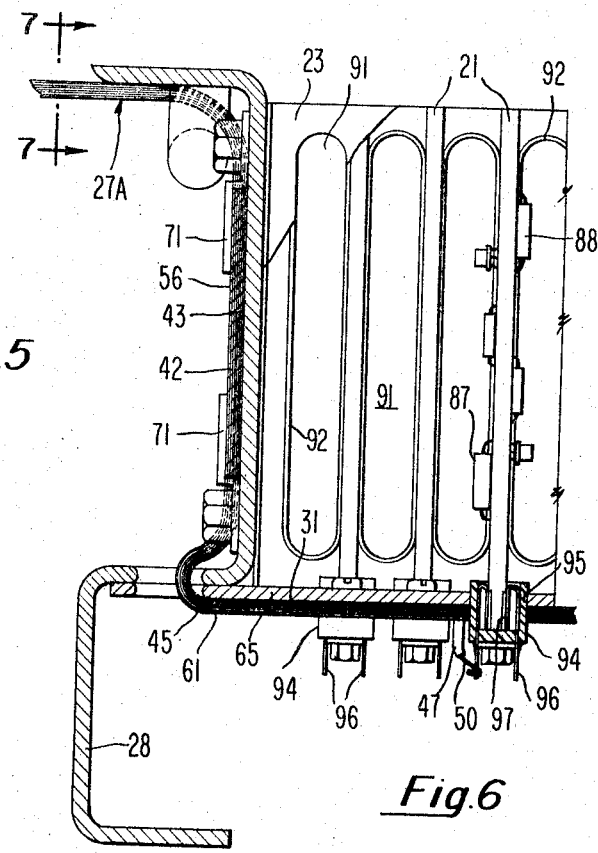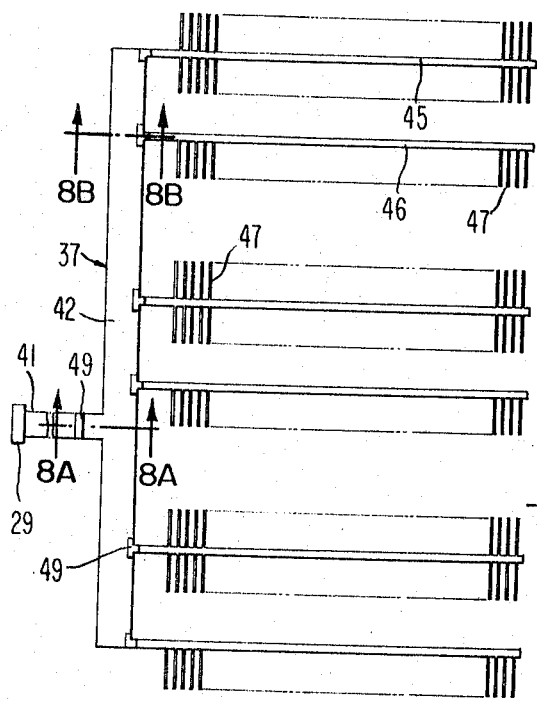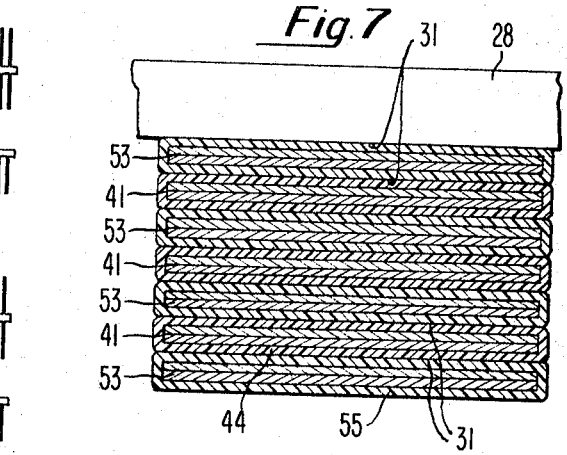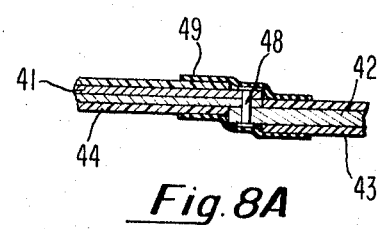

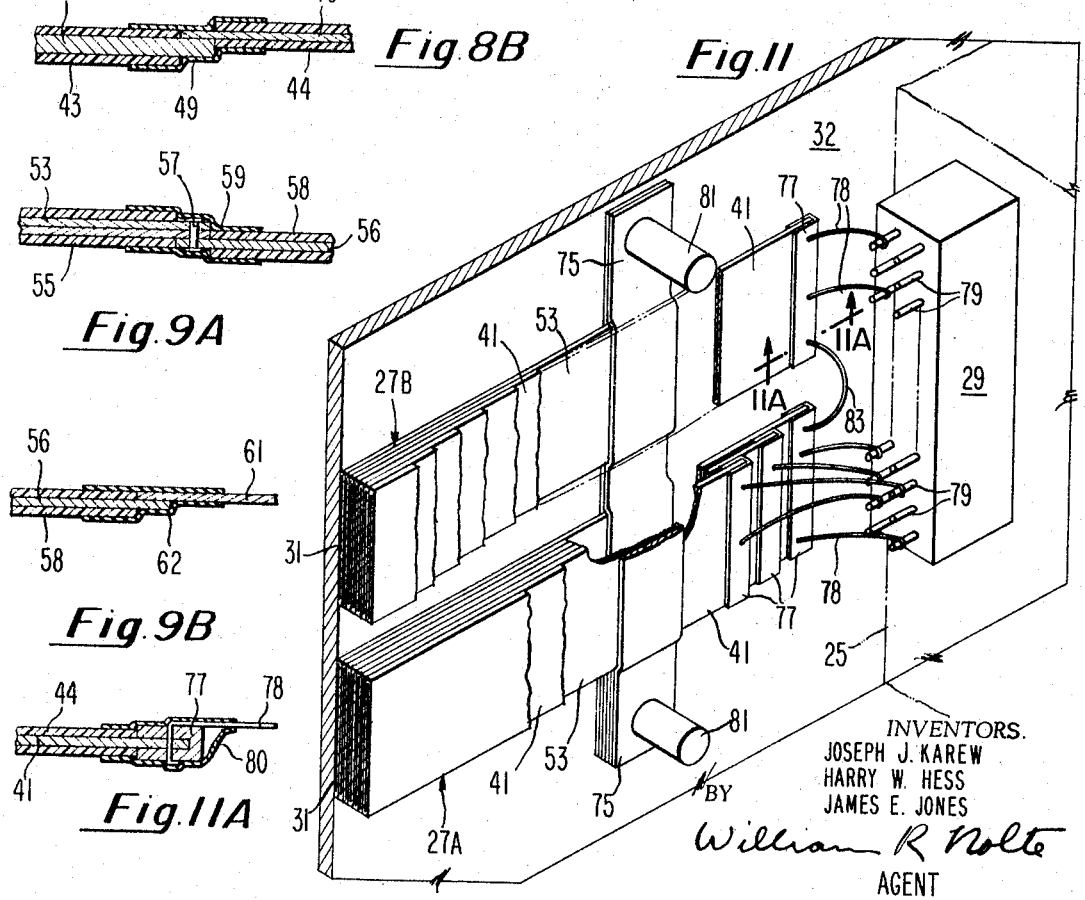

United States Patent Office 3,320,488
Patented May 16, 1967

3,320,488
STRIP LINE POWER HARNESS
Joseph J. Karew, Warminster, Harry W. Hess, Norristown, and James E. Jones, Malvern, Pa., assignors to Burroughs Corporation, Detroit, Mich., a corporation of Michigan
Continuation of application Ser. No. 268,771, Mar. 28, 1963. This application July 26, 1966, Ser. No. 568,059
5 Claims. (Cl. 317—101)

This application is a continuation of application Ser. No. 268,771, filed Mar. 28, 1963, now abandoned.

This invention relates to power supply apparatus for distributing D.C. voltages from a power source to a utilizing load and more particularly, to power distribution apparatus for a digital computer system.

The source impedance, presented to a load utilizing means in a computer system consists of the combined power supply impedance and the distributed resistance, inductance and capacitance of the connecting distribution voltage leads. For low frequency load currents, the connecting leads may present an insignificant reactive loss; however, as the operating frequency increases this line loss increases and results in degraded regulation and marginal computer operation. The recent advances in high speed computer technology requires that very low impedance voltage connecting lines be used. Essentially, the high frequency loads dictate the need for extremely low impedance distribution lines with low inductance and high capacitance and highly conductive power lines. In this respect, conventional wiring techniques utilizing wires of round cross-section can only solve the D.C. conductive problems while flattened strip lines separated by thin dielectric material sandwiched between ground strips guarantee a minimum inductance and a maximum distributed capacitance. Essentially, the characteristic impedance (at high frequencies) is determined by the following relationship $$Z_0 = (L/C)^{1/2}$$

where
$Z_0$ = the characteristic impedance
$L$ = distributed inductance per unit length
$C$ = distributed capacitance per unit length It is an object of this invention therefore to provide an improved power supply apparatus for a computer system which avoids one or more disadvantages of the prior art arrangements and which has an improved conductivity.

It is a further object of this invention to provide a novel power supply apparatus for a computer system having an improved high frequency conductivity.

In accordance with a preferred form of the invention in a computer system, power supplies and power distribution apparatus are provided. Each cabinet or housing of the system has its own complete power supply and control system. One portion of the power supply is connected with a receptacle and from this receptacle two groups of flat ribbon-like voltage busses with their external surfaces insulated, each extend into a movable module or rack which may be hingedly mounted. A plurality of insulated ground shields generally of the like outline form as the voltage busses are cemented top and bottom to each group and are also interleaved and cemented between adjacent voltage busses of the group by means of an electrically conductive cement. The ground shields are grounded at one end to the cabinet adjacent said receptacle and extend into the hinged logic card racks for suitable connection at their opposite ends. Each group of voltage busses thus feed power to circuits carried by said printed circuit cards.

For a better understanding of the invention, together with other and further objects thereof, reference is had to the following description taken in conjunction with the accompanying drawings and its scope will be pointed out in the appended claims.

FIG. 5 is a portional view of the upper lefthand part of FIG. 3, greatly enlarged;

FIG. 6 is a sectional view taken along the line 6—6 of FIG. 5;

FIG. 7 is a sectional view taken along the line 7—7 of FIG. 6;

FIG. 8 shows a schematic composite view of a typical voltage bus;

FIG. 8A is a sectional view taken along the lines 8A—8A of FIG. 8;

FIG. 8B is a sectional view taken along the line 8B—8B of FIG. 8;

FIG. 9 is a schematic composite view of a typical ground shield generally similar to the voltage bus shown in FIG. 8;

FIG. 9A is a sectional view taken along line 9A—9A of FIG. 9;

FIG. 9B is a sectional view taken along the line 9B—9B of FIG. 9;

FIG. 10 is a sectional view along the lines 10—10 of FIG. 5 showing the insulation on the ground strips removed;

FIG. 11 is a pictorial view looking in the direction of the arrow 11 in FIG. 2;

FIG. 11A is a sectional view taken along the line 11A—11A of FIG. 11.

Figure 1:
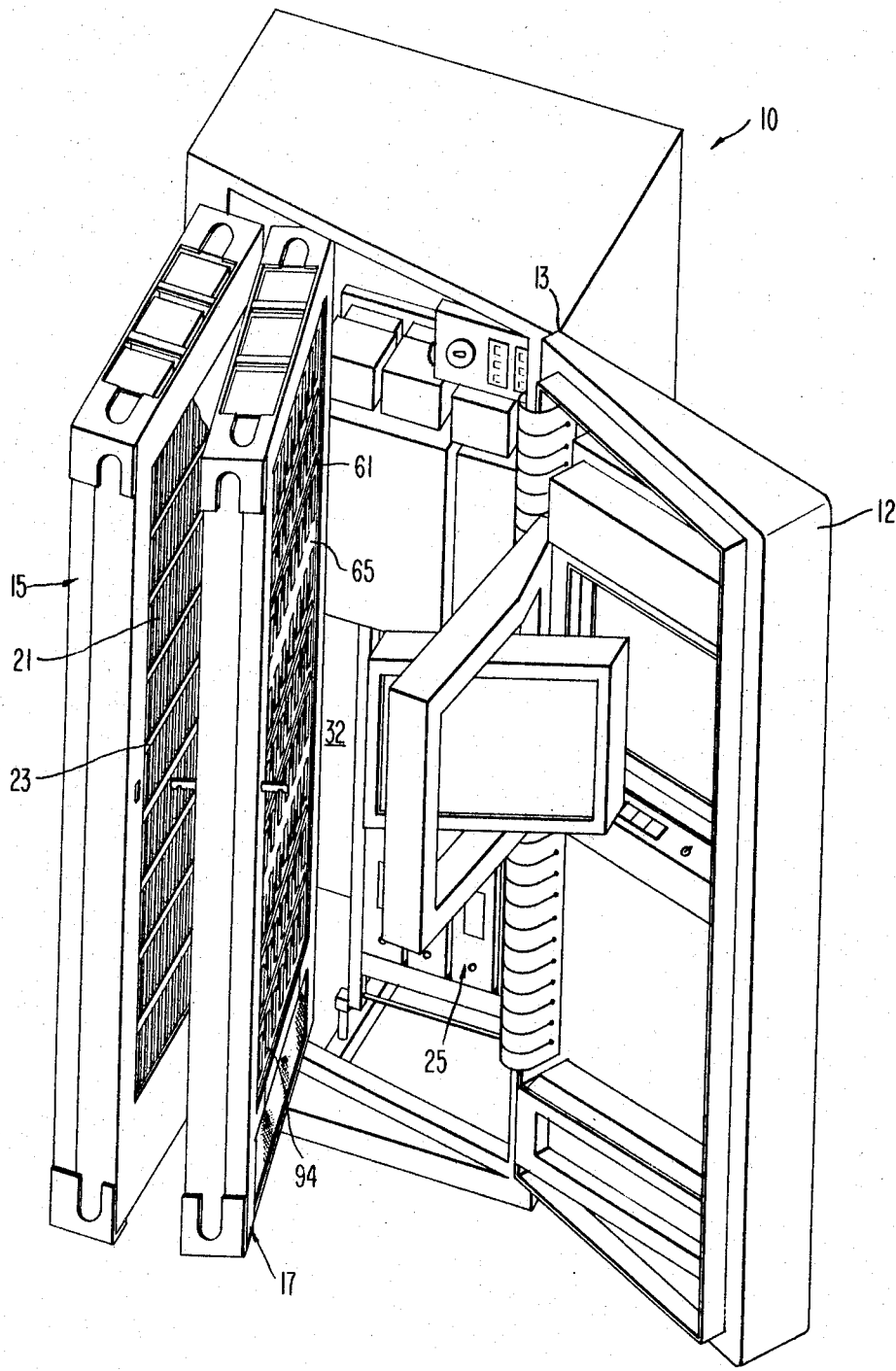
FIG. 1 is a perspective view of a computer cabinet in its open position and showing logic card folding racks or modules hinged to the computer cabinet frame.
Figures 3, 4:
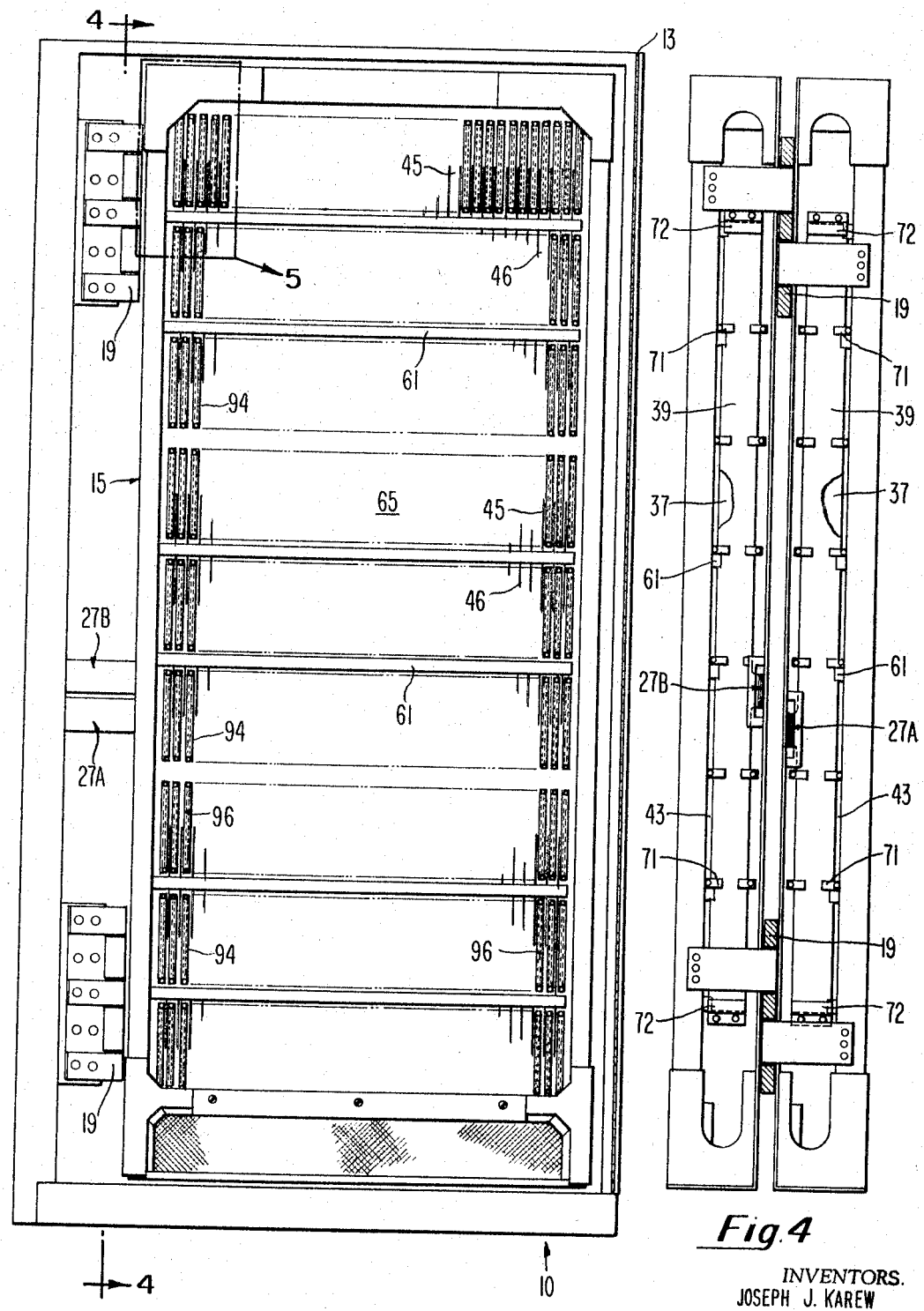
FIG. 3 is a front elevational view of the cabinet with the front door thereof removed and showing one of the logic card holding racks.
FIG. 4 is a vertical sectional view taken along the line 4—4 of FIG. 3 to show the hinge rails of the racks.

Referring to FIGS. 1 and 3 of the drawings, there is shown a computer cabinet 10 with its front panel 12 hinged to its open position about axis 13. A pair of rack assemblies 15 and 17 hinged about axis 19 along the opposite side of the cabinet include tiers of printed circuit cards 21, which are supported by transverse guide plates 23. These cards carry the logic circuitry for the computer system.

Figure 2:
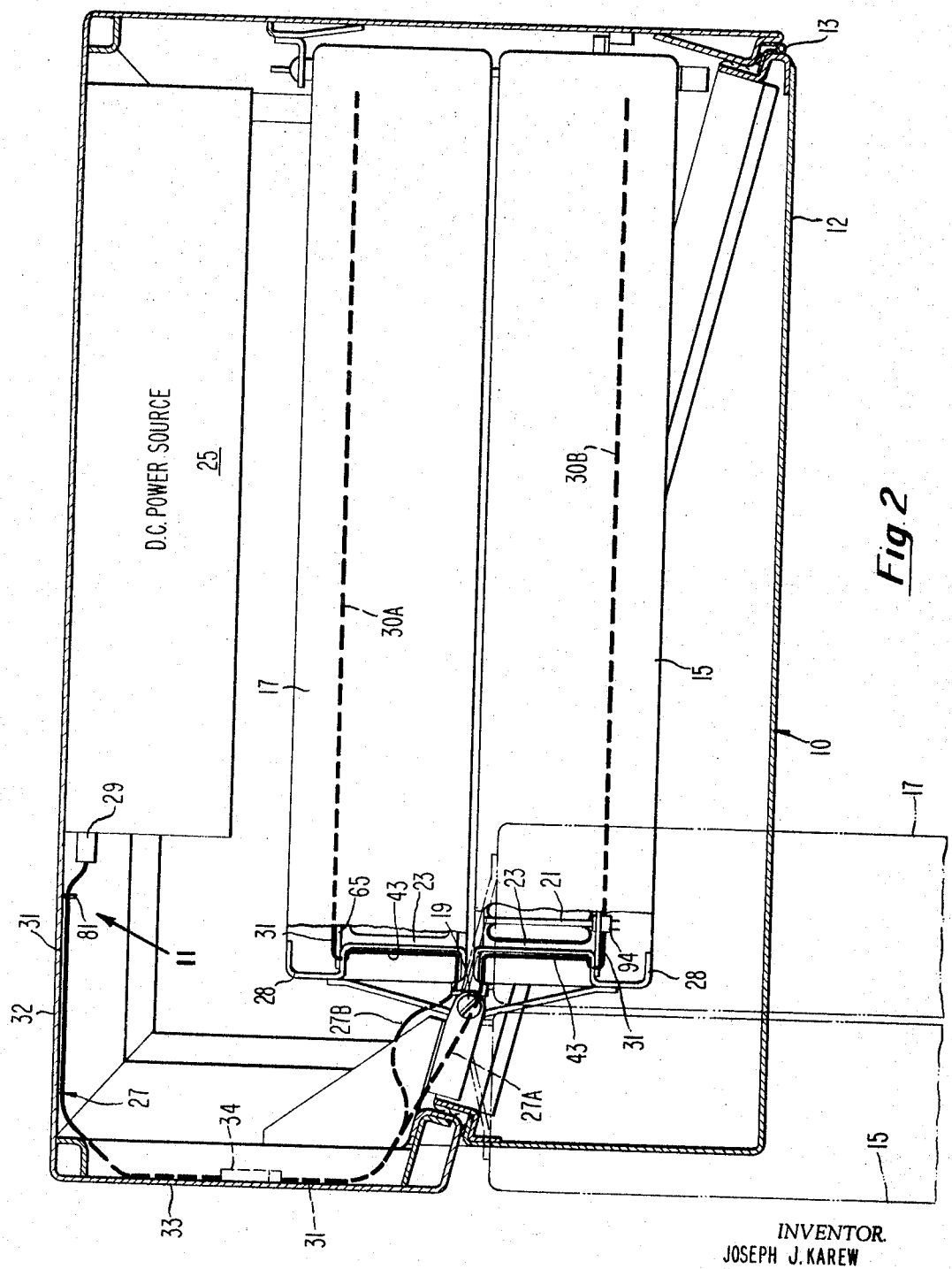
FIG. 2 is a plan view of the cabinet in its closed position, partially in section with the topmost portion of the cabinet removed and showing the racks in their closed position.

Interiorly of each cabinet, FIG. 2, there is provided a D.C. power supply 25 which is fed to the aforementioned printed circuit cards by means of a power harness assembly 27 designated schematically in heavy black solid and dotted lines. In the present embodiment of the invention the power harness assembly comprises two groups designated 27A and 27B, the former being fed to the front rack 15 and the latter to the rearmost rack 17. The power harness includes a D.C. receptacle 29 connected to the power source 25 and transverse harness sections 30A and 30B which extend within the racks 15 and 17. The two groups of said power harness 27A and 27B extending in parallel from the receptacle 29 which receives power from said power supply, are cemented by means of an electrically conductive cement 31 to back wall 32, and to the left side wall 33. Each group then separates one from the other, to face and pass through the Z-shaped rack side rail members 28, to feed the tiers of printed circuit cards 21 in their respective racks 15, 17. A suitable clamp 34 fastens both groups of the assembly to the side wall 33.

Since both power harness groups 27A and 27B are generally similar in detail, a discussion of one will suffice for the other. By way of example, the power harness group designated 27A is made up of a series of flat copper voltage busses 37 indicated in outline form in FIG. 8, stacked one upon another but separated by a series of ground shields 39 of the same general outline form as shown in FIG. 9. A pair of ground shields 39 in addition sandwich the entire groups so that each voltage bus has a ground shield electrically cemented in contact with one of its opposite flat faces throughout substantially its entire length, as will be described in greater detail hereinafter.

Referring now to FIG. 8, each voltage or power bus 37 includes a horizontal feeder belt portion 41, which is routed along the rear and side walls of the cabinet, a large vertical portion 42 of which is positioned within the Z-shaped rack side rail member 28, and a plurality of transverse power distribution segments 45 and 46 which include comb-like finger portions 47 suitably spaced along the length of said segments. In order to permit flexing action of the feeder belts when the rack members 15 and 17 are pivoted about the common hinge axis 19, the feeder belt portion 41, FIG. 8, may be made of multiple ply sheet copper as shown in FIG. 8A. The external surfaces of the two ply feeder belt portion is suitably insulated as at 44. The central bus portion 42 is shown in the form of a heavy single ply copper and similarly insulated as at 43. The bus portion is then joined to the bearing portion by means of brass eyelets 48 with the internal facing surfaces suitably soldered. Additional insulation 49 is thereafter applied to the joint so formed. With reference to FIG. 8B the transverse power harness 46, from which fingers 47 extend, may be joined for example as by soldering to the central heavy vertical section 42 and the electrical joint so formed may also be insulated as at 49. The remaining external surface of the harness 46 is insulated as at 44.

With reference to FIGS. 9 and 9A, the horizontal feeder belt portion 53 of the ground shield 39 engages in facing contact the feeder belt bus portion 41 as will be later described and is likewise routed from along the rear and side walls 32, 33 of the cabinet 10. In order to facilitate flexure due to the hinging action of the racks, portion 53 is likewise formed of two ply sheet copper and is insulated as at 55. It is similarly electrically connected to the vertical ground shield portion 56 as by brass eyelets 57 and solder. The vertical ground shield 56 it is noted, is of less thickness than the voltage bus portion 42 and is provided with insulation 58 at its external surfaces. The brass eyelet-solder connection so formed is likewise insulated as at 59. Along the opposite edge of central ground shield 56, a plurality of horizontally disposed portions 61 of sheet copper are suitably connected thereto as by soldering in the manner as indicated in FIG. 9B. This latter connection is also properly insulated as at 62 for example, as by tape, to protect the same when interleaved between voltage bus portions 42 in the manner hereafter to be described. It should be noted that the transverse portions 61 do not include portions which correspond to fingers 47 of the transverse power distribution segments 45, 46 of FIG. 8.

Each of the harness groups 27A, 27B made up of ground shields 39 of overall outline form as shown in FIG. 9, and voltage busses 37 of outline form as shown in FIG. 8, are superimposed and cemented together by electrically conductive cement in alternate ground shield and voltage bus layers. The build-up of the layers as illustrated in FIGS. 6 and 10, is as follows: commencing first with the transverse printed circuit socket supporting plate 65, the first layer of material of said power harness is an uninsulated transverse ground shield strip segment 61. This may be cemented in position to the plate by means of an electrically conductive cement 31. The purpose of this is to both hold the strips in place physically and to give a low impedance ground. The next adjacent layer electrically cemented thereto is the segment of the transverse voltage bus harness 45 which is of single ply insulated copper as previously described. The third layer from said supporting plate is another ground shield segment 61, and the fourth layer, a voltage bus segment 45, and so forth, all cemented together by means of an electrically conductive cement and concluding with a ground shield segment 61 as the outside layer.

This alternate ground shield-voltage bus array may be observed also in connection with FIG. 7 which represents a cross-sectional view taken through the feeder belt section of each harness group. Thus the insulated two-ply feeder belt ground segment 53, FIG. 9, is shown cemented by means of an electrically conductive cement into contacting engagement with the Z-shaped hinge side rail 28 of the printed circuit card rack 15, while the next adjacent layer is that of the feeder belt voltage bus portion 41, of FIG. 8. Successive layers outwardly from said hinge rail consist of ground shield 53 and voltage bus layers 41 etc., to terminate with an outermost ground shield layer 53. As seen in FIGS. 4 and 6, the central portion of the entire harness group 27A made up in alternate layers as described, is secured to the inner hinge side rail by means of suitable clips 71, and by top and bottom brackets 72, FIG. 4. As indicated in the last named figure, the feeder belt portion of the power harness group 27A lies below the feeder belt portion of group 27B, and are so routed along the side wall 33 and back wall 32 of the cabinet 10, to the D.C. power supply 25.

With reference to FIG. 11, the feeder belt portions of the ground shield segments 53 of each of the groups 27A and 27B which are in surface contacting engagement with the back wall 32 of said cabinet are electrically connected by means of a pair of solder strips 75 which transversely bridge said endmost ground shield portions. The insulated voltage busses 41 which lie on top of said lowermost contacting ground strips 53 pass beyond the solder strip 75 and are terminated short of the receptacle 29. As seen in FIG. 11A the insulation 44 is removed and a solder bent end strip 77 is folded over the ends so exposed and conductive wires 78 are passed therethrough and joined to the conductor pins 79 of receptacle 29. An insulative layer 80 is then applied over the bent end strip 77 and wire 78 to prevent the same from shorting out. Thereafter the secondmost ground shield feeder belt segments from said back cabinet wall are likewise bridged by a second set of transverse solder strips 75 while the voltage feed bus segments which lie on top of said second ground strips are connected similarly by wires 78, to said pins 79 of said receptacle. The remaining layers are secured similarly by solder strips which are all aligned in superimposed relation and are then suitably drilled and secured to the cabinet wall 32 by ground studs 81. The remaining like spaced voltage feeder belt portions from said back cabinet wall of both of said groups 27A, 27B are connected by loops of wire as at 83.

With reference now to FIGS. 5 and 6, it can be seen that the printed circuitry previously referred to comprising the plurality of printed circuit boards 21, have mounted thereupon electrical components 87, 88 which employ high frequency A.C. and are of the type employed in present day computer systems FIG. 6. Rows of said printed circuit boards are supported transversely of said racks 15 and 17 as previously described by means of supporting shelves 23 having elongated apertures 91.

The material around each aperture is turned to form lips 92 with top and bottom shelf portions to thereby provide a series of U-shaped guides to position each card in its proper location. The transverse socket supporting plate 65 also includes apertures as at 95 to receive in each a printed circuit socket 94. The latter include spring-like contacts 96 which engage contact pads 97 of said printed circuit boards to grip the printed circuit boards in place. Free ends of selected contacts 96 are connected to the uninsulated finger-tip portions 50 of fingers 47 of said voltage bus harness portions 45, 46 to thereby provide said printed circuit boards with sources of D.C. voltage. Since each group 27A, 27B of said power harness includes a plurality of layers of voltage busses, it should be noted that each such layer may be of a different voltage level. Moreover, since the ground shield busses extend the full length of the voltage busses, i.e., from the source 25 to the point of utilization at the printed circuit sockets 94, there is no impedance discontinuity.

From the above description it is seen that in a computer employing high frequency circuitry that there has been provided a low impedance, low inductance, highly conductive and adequately insulated and shielded power distribution system. Such a system of this type is mandatory in certain types of high speed computers. Although D.C. power is transmitted, a low impedance is necessary to eliminate certain adverse effects. By employing the flat, wide strip line power distribution means as above described, in a present day high frequency computer system, highly satisfactory results have been achieved.

What is claimed is:

1. In a power supply apparatus for providing low inductance, low impedance, power distribution from a power source to a power utilizing module, the latter having a frame for supporting a plurality of printed circuit card utilizing means, the combination comprising:
   a rack assembly including means hinged and swingably movable between open and closed positions about the axis of the hinge;
   a plurality of rows of printed circuit utilizing means supported within and disposed transversely of the hinge axis of said rack assembly;
   electrical power source means supported within said cabinet;
   power harness means for supplying power from said source to said printed circuit utilizing means including a plurality of layers of relatively flexible, relatively thin, flat, elongated, electrically conductive uninsulated ground conductor busses having horizontal feeder belt portions, vertical portions orthogonally arranged relative to said feeder belt portions, and a plurality of segments extending parallel to said horizontal portions; and a plurality of layers of relatively flexible, relatively thin, flat, elongated, electrically insulated power conductor busses having horizontal feeder belt portions, vertical portions orthogonally arranged relative said feeder belt portions, and a plurality of power distribution segments parallel to said horizontal portions;
   each said electrically insulated power conductor bus being inserted between a pair of said layers of ground conductor busses thereby constituting an alternate power conductor and ground unitary assembly;
   said assembly being routed along the walls of said rack assembly and secured to and along the hinge area of said rack assembly, and connected at its one end to said power supply and continuously extending from said power supply to said circuit utilizing means passing along said hinge area and having certain of the opposite ends of the power distribution segments connected to said circuit utilizing means so that said unitary assembly provides a plurality of continuous shielded power paths capable of flexing back and forth in the manner of a hinge when said hinged means is moved.

2. In a power supply apparatus for providing low inductance, low impedance, power distribution from a power source to a power utilizing module, the latter having a frame for supporting a plurality of printed circuit card utilizing means, the combination comprising:
   a cabinet;
   a rack assembly including frame means hinged to said cabinet and swingably movable between open and closed positions about the axis of the hinge;
   a plurality of rows of printed circuit utilizing means supported within and disposed transversely of the hinge axis of said rack assembly;
   electrical power source means supported within said cabinet;
   power harness means for supplying power from said source to said printed circuit utilizing means including a plurality of layers of relatively flexible, relatively thin, flat, elongated, electrically conductive uninsulated ground conductor busses having horizontal feeder belt portions, vertical portions orthogonally arranged relative to said feeder belt portions, and a plurality of further portions parallel to said horizontal portions; and a plurality of layers of relatively flexible, relatively thin, flat, elongated, electrically insulated power conductor busses having horizontal feeder belt portions, vertical portions orthogonally arranged relative said feeder belt portions, and a plurality of power distribution portions parallel to said horizontal portions, each said electrically insulated power conductor bus being inserted between a pair of said layers of ground conductor busses;
   means connecting together said layers of ground busses and power busses effectively forming the same into an alternate power conductor and ground unitary assembly;
   said unitary assembly being cemented to and along the hinge area of said rack assembly, and connected at its one end to said power supply and extending continuously from said power supply along said hinge area to said circuit utilizing means and having the power distribution portions connected to said circuit utilizing means, said unitary assembly being capable of bending back and forth in the manner of a hinge when said frame means is moved from open to closed position.

3. The invention in accordance with claim 2 wherein said power distribution portions extend between each row of printed circuit utilizing means and each one of such portions further includes integral comb-like finger members normal to said power distribution portions and projecting between and extending parallel to said printed circuit means for electrical connection with the contacts of said printed circuit utilizing means.

4. In power supply apparatus for providing low inductance, low impedance, power distribution from a power source to a power utilizing module, the latter having a frame for supporting a plurality of printed circuit card utilizing means, the combination comprising:
   a cabinet;
   a rack assembly hinged to said cabinet and movable between open and closed positions about the axis of the hinge;
   a plurality of rows of printed circuit utilizing means supported within and disposed transversely of the hinge axis of said rack assembly;
   electrical power source means supported within said cabinet;
   power harness means for supplying power from said source to said printed circuit utilizing means at least a portion of which extends parallel to the hinge axis of said rack assembly;
   said power harness means including a plurality of layers of relatively flexible, thin, flat, elongated, electrically conductive, uninsulated ground conductor busses and a plurality of relatively flexible, thin, flat, elongated, electrically conductive power busses, each power bus having a pair of opposed electrically insulated faces;
   each said electrically insulated power bus being inserted between a pair of said layers of ground conductor busses effectively separating the same and providing a high capacitive alternating power conductor and ground unitary assembly;
   each said electrically conductive bus and ground conductor bus including a first portion normal to said hinge axis, a second portion parallel to said hinge axis and a third portion integral with said second portion at right angles to said second portion and arranged to form a plurality of individual comb-like finger projections of appropriate length to be positioned in exact juxtaposition to said printed circuit utilizing means;

said unitary assembly being conductively secured to the hinge area of said rack assembly, and connected at its one end to said power supply and extending from said power supply to said circuit utilizing means along said hinge area and having the third integral portions connected to said circuit utilizing means.

5. The invention in accordance with claim 2 wherein the means connecting together said layers of ground busses and power busses into an alternate power conductor and ground unitary assembly is an electrically conductive cement effective both to hold the layers in place physically and provide a low impedance ground for said power supply apparatus.

No references cited.

ROBERT K. SCHAEFER, *Primary Examiner.*

J. R. SCOTT, *Assistant Examiner.*